United States Patent
Poon et al.

(10) Patent No.: US 6,188,209 B1
(45) Date of Patent: Feb. 13, 2001

(54) STEPPING INDUCTOR FOR FAST TRANSIENT RESPONSE OF SWITCHING CONVERTER

(75) Inventors: Franki Ngai Kit Poon; Man Hay Pong; Joe Chui Pong Liu, all of Hong Kong (CN)

(73) Assignee: University of Hong Kong (HK)

( * ) Notice: Under 35 U.S.C. 154(b), the term of this patent shall be extended for 0 days.

(21) Appl. No.: 09/499,836

(22) Filed: Feb. 7, 2000

(51) Int. Cl.[7] ......................................... G05F 1/14
(52) U.S. Cl. ...................... 323/255; 323/224; 323/282
(58) Field of Search ................................. 323/255, 224, 323/282, 284, 285, 286, 287, 225

(56) References Cited

U.S. PATENT DOCUMENTS

| | | | |
|---|---|---|---|
| 4,843,301 | * 6/1989 | Belanger | 323/299 |
| 5,485,076 | * 1/1996 | Schoenwald et al. | 323/225 |
| 5,592,071 | * 1/1997 | Brown | 323/282 |
| 5,808,454 | * 9/1998 | Chung | 323/255 |
| 5,822,166 | 10/1998 | Massie . | |
| 5,838,145 | 11/1998 | Poon et al. . | |
| 5,929,692 | 7/1999 | Carstein . | |

* cited by examiner

Primary Examiner—Shawn Riley
(74) Attorney, Agent, or Firm—Jones, Day, Reavis & Pogue

(57) ABSTRACT

A fast transient response power converter is disclosed which makes use of a variable inductor to speed up the converter's output voltage response under fast transient conditions. The inductive element in a switching converter is replaced by two series or parallel inductive elements of which one has a smaller inductance value and the other has a larger inductance value. During the fast transient condition, the total inductance is greatly reduced to allow rapid current change during the transient condition.

42 Claims, 11 Drawing Sheets

GATE DRIVE OF GATE M1

GATE DRIVE OF GATE M2 t1    t2
LOAD CURRENT t0            t1    t2
INDUCTOR CURRENT

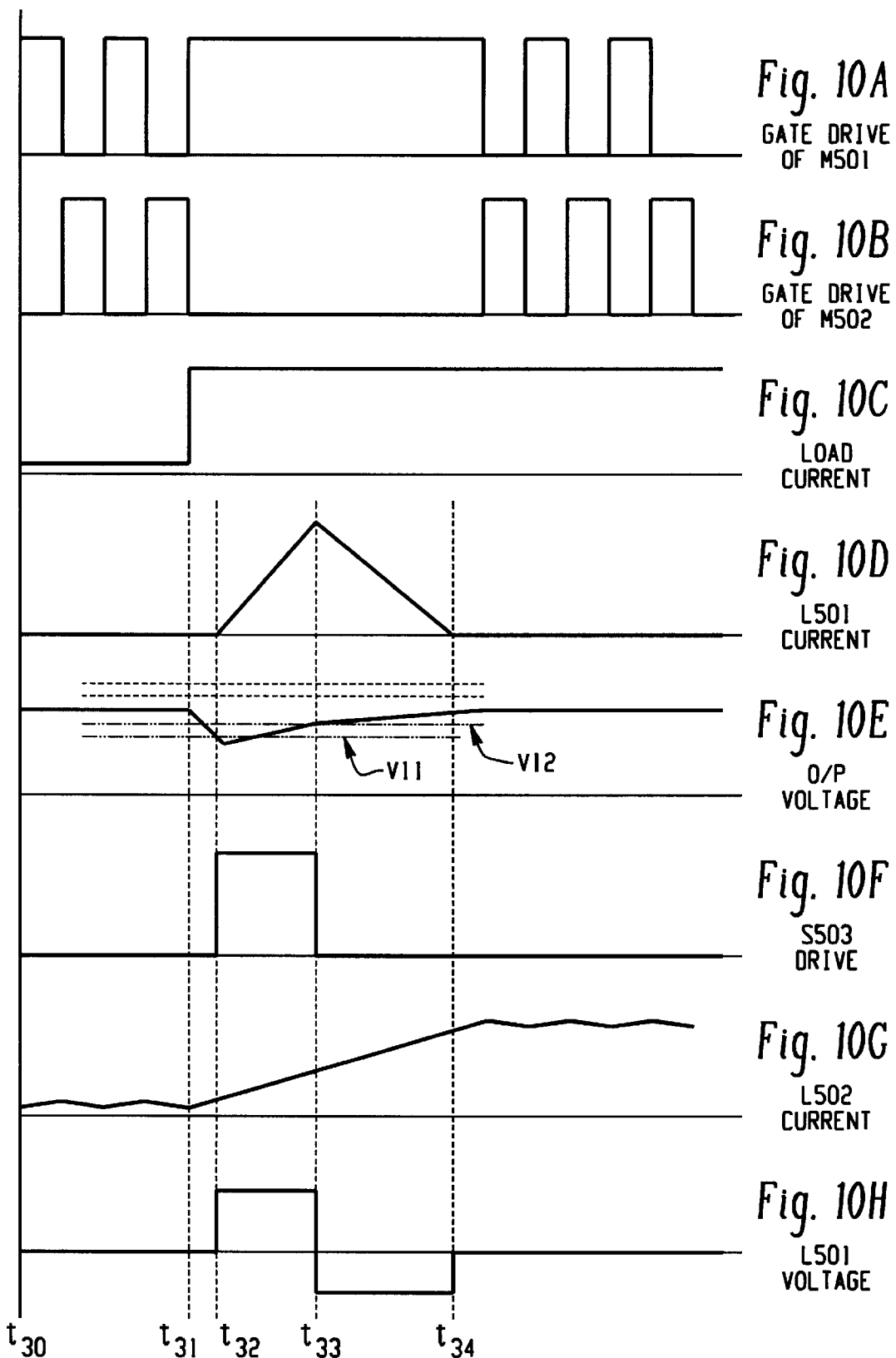

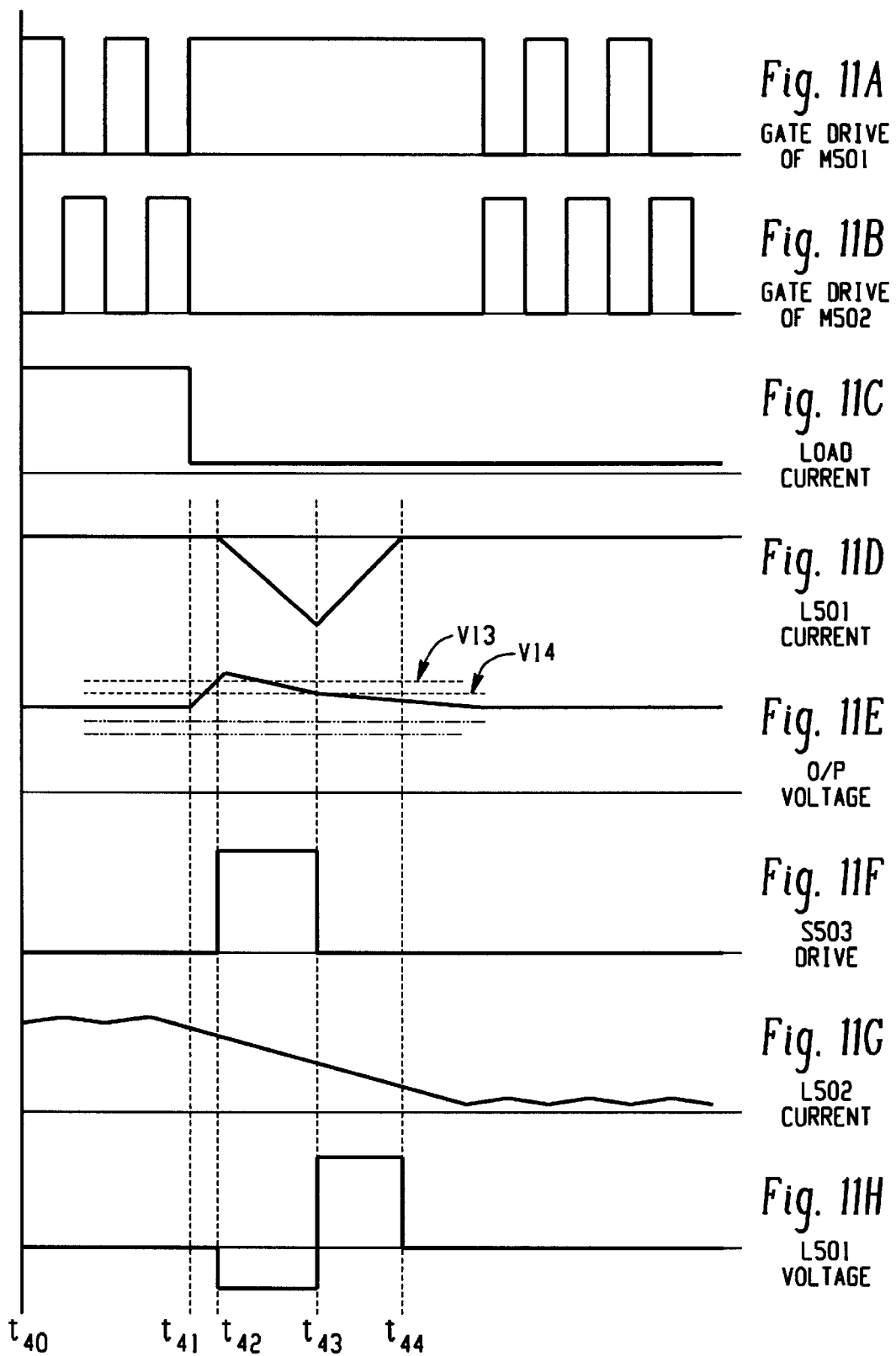

STEPPING INDUCTOR FOR FAST TRANSIENT RESPONSE OF SWITCHING CONVERTER

FIELD OF THE INVENTION

The present invention relates to the field of switch mode power converters.

BACKGROUND OF THE INVENTION

Switching converter topologies are widely used as the major building block in high efficiency and lightweight power supplies such as those used in computer applications. A major shortcoming of switching converters, however, is its transient output response to a fast load change. Because most switching power converters include an output inductor, a switching power converter's transient response is inherently limited. For example, a typical buck converter comprises a power stage having a plurality of switches and an inductor-capacitor filter, and a feedback circuit. The feedback circuit monitors the converter output voltage and exerts pulse width modulation control over the switches. When there is a fast dynamic load change, the converter's ability to respond is limited by the feedback circuit and the power stage. The feedback circuits can be designed to respond quicker through traditional linear or non-linear approaches. The inherent response of the converter, however, is limited by the power stage and, in particular, the output inductor.

Some have attempted to improve upon the power converter's dynamic response by using an inductor with a small inductance value. This technique does improve the power converter's dynamic response because current flow can change much more quickly when a small indicator is used. This technique, however, is disadvantaged in that the use of a small inductor results in a ripple current during normal operation. High ripple current introduces high root mean square current in the converter switches and passive components and, as a result, increases the power loss.

Others have attempted to reduce power losses by using parallel switches to share the current, but this method increases the cost and complexity of the converters. Still others have attempted to improve upon the converter's transient response by increasing the converter's switching frequency. This technique is disadvantaged in that it induces excessive switching losses in the switches and excessive magnetic losses in the inductor core. Moreover, high frequency operation requires the use of high performance drive circuit which can further escalate the converter's cost.

Therefore, there remains a need for a method of providing a switching power converter with a fast transient response while minimizing the converter's power loss.

SUMMARY OF THE INVENTION

To improve upon the foregoing technology as disclosed in the current state-of-the-art, the present invention discloses an apparatus and method for improving the transient response of switching power converters. The present invention dramatically increases the rate of change of current through the converter's output inductor by causing the output inductor to enter a lower inductance state during transients while maintaining low current ripple at normal load by keeping the output inductor at a higher inductance state during steady state conditions.

The present invention provides many advantages over presently known power conversion topologies. Not all of these advantages are simultaneously required to practice the invention as claimed, and the following list is merely illustrative of the types of benefits that may be provided, alone or in combination, by the present invention. These advantages include: (1) fast dynamic response; (2) low output inductor ripple current; (3) increased power efficiency; (4) lack of a need to operate at a high switching frequency; (5) adjustability to the load demands; (6) non-complex control method; and (7) applicability to most power converter topologies.

In accordance with the present invention, a power conversion topology is provided that includes input means for receiving input power, an output for providing regulated output power, and a variable inductance device coupled between the input means and the output. The variable inductance device has both a higher inductance state and a lower inductance state. The variable inductance device is controllable to switch between the higher inductance state and the lower inductance state. In one embodiment, the power converter further includes a control circuit that is operable to signal the variable inductance device to switch from one of the inductance states to the other inductance state.

In accordance with the present invention, the variable inductance device, in one embodiment, comprises a fixed component and a variable component in series with the fixed component. The variable inductance component optionally comprises a transformer having a plurality of windings magnetically coupled to each other wherein a first winding is coupled in series with the fixed inductance component. A second and third winding are each optionally coupled in series with a power source and a switch wherein the application of the power source to one of the second or third windings through the use of the switches has the effect of reducing the effective inductance of the variable inductance component.

In another embodiment, the variable inductance device comprises a lower inductance element, a switch coupled in series with the lower inductance element thereby forming a switch and lower inductance element series combination, and a higher inductance element coupled in parallel with the switch and lower inductance element series combination. The switch is operable to switch the variable inductance device between the lower inductance state and the higher inductance state by coupling or decoupling the lower inductance element in parallel to the higher inductance element.

BRIEF DESCRIPTION OF DRAWINGS

The present invention will become more apparent from the following description when read in conjunction with the accompanying drawings wherein:

FIGS. 10A–10H is a waveform diagram showing the response of the fifth embodiment of the present invention when there is a fast transient increase in load current; and FIGS. 11A–11H is a waveform diagram showing the response of the fifth embodiment of the present invention when there is a fast transient decrease in load current;

DETAILED DESCRIPTION OF THE PREFERRED EMBODIMENTS

Figure 1:
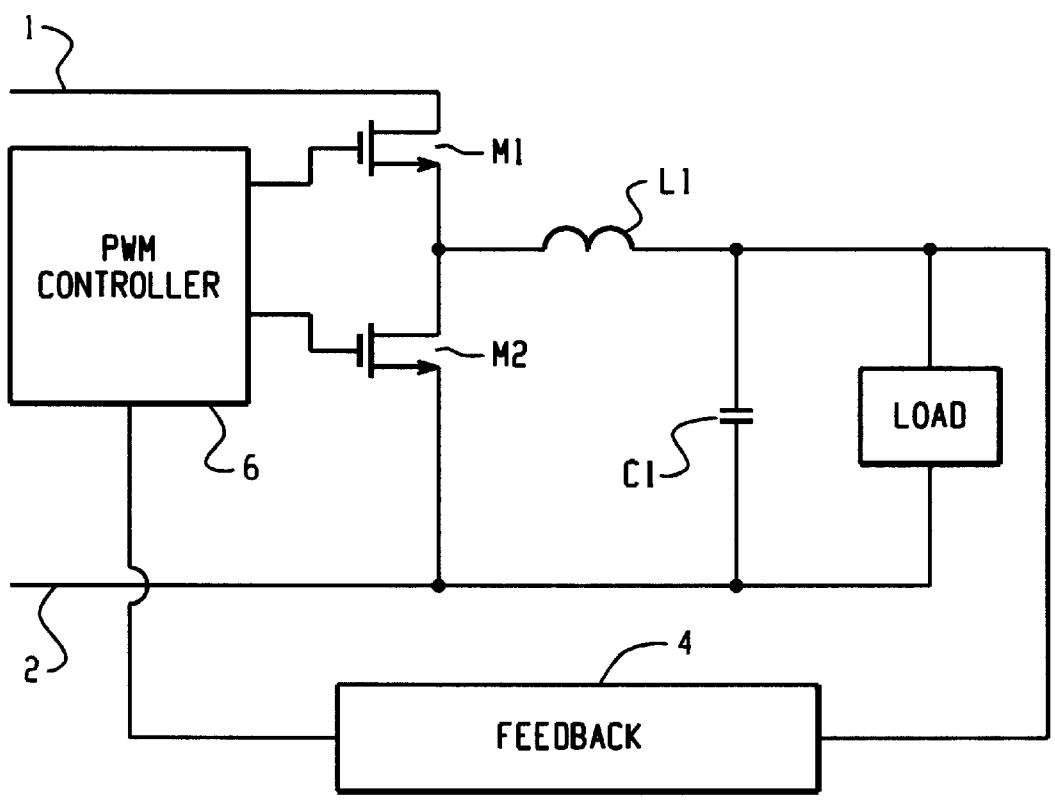
FIG. 1 is a simplified equivalent circuit of a prior art Buck power converter.
Figure 2A:
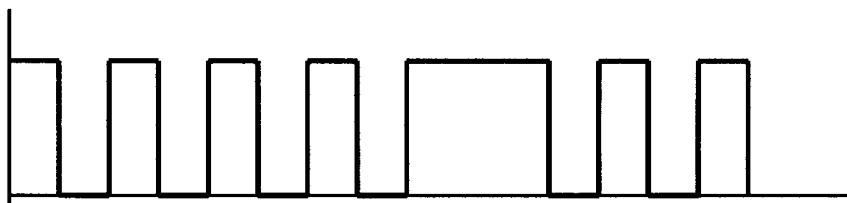
FIGS. 2A–2D is a waveform diagram for the Buck converter circuit shown in FIG. 1 during a load transient.
Figure 2B:
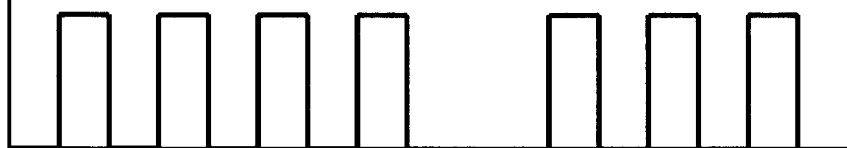
Figure 2C:
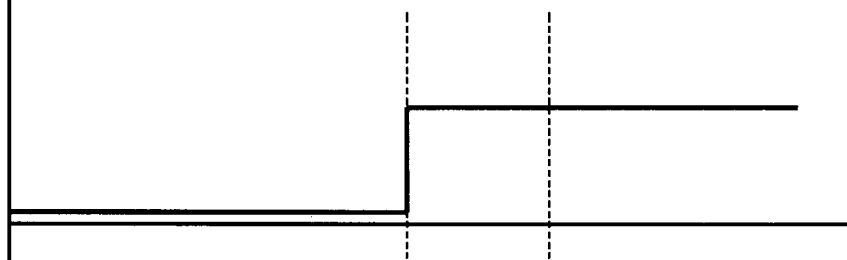
Figure 2D:
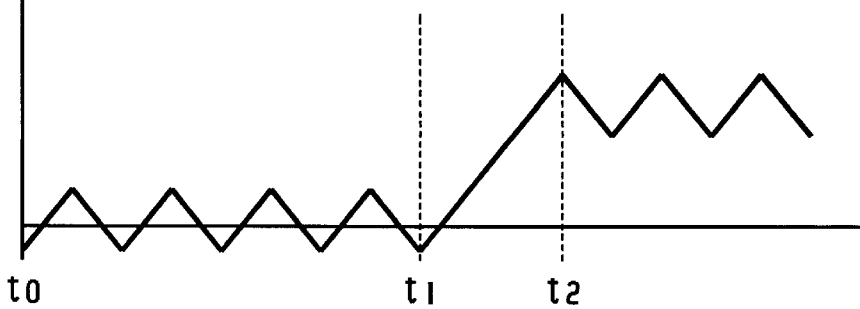

The discussion that follows describes embodiments of the present invention when incorporated into a buck power converter topology. It will be obvious to those skilled in the art that the present invention can also be applied to other power converter topologies such as a boost converter, a flyback converter, a forward converter, a push-pull converter, a resonant converter, a full bridge converter, a Cuk converter, a Sepic converter, a half bridge converter and other converter topologies. Referring now to the figures, FIG. 1 sets forth a prior art buck converter having two switches M1 and M2, an output inductor L1, and an output capacitor C1. FIG. 2 illustrates the operation of a typical buck converter when there is a step increase in the load current, assuming that the feedback circuit 4 and the Pulse Width Modulation controller 6, as shown in FIG. 1, are fast enough to change the duty cycles of the converter switches M1 and M2 to enable the inductor current in inductor L1 to rise to a new average. The rate of inductor current increase is limited by the inductance of the output inductor L1. An inductor L1 with low inductance allows for a fast rate of inductor current change in the converter. But, the converter will suffer from having a high ripple inductor current. An inductor L1 with high inductance will reduce the ripple current in the converter but the inductor current will transition more slowly. The present invention provides a novel way of providing a fast inductor current rate change while at the same time providing a way of reducing the ripple current.

FIRST EMBODIMENT

Figure 3:
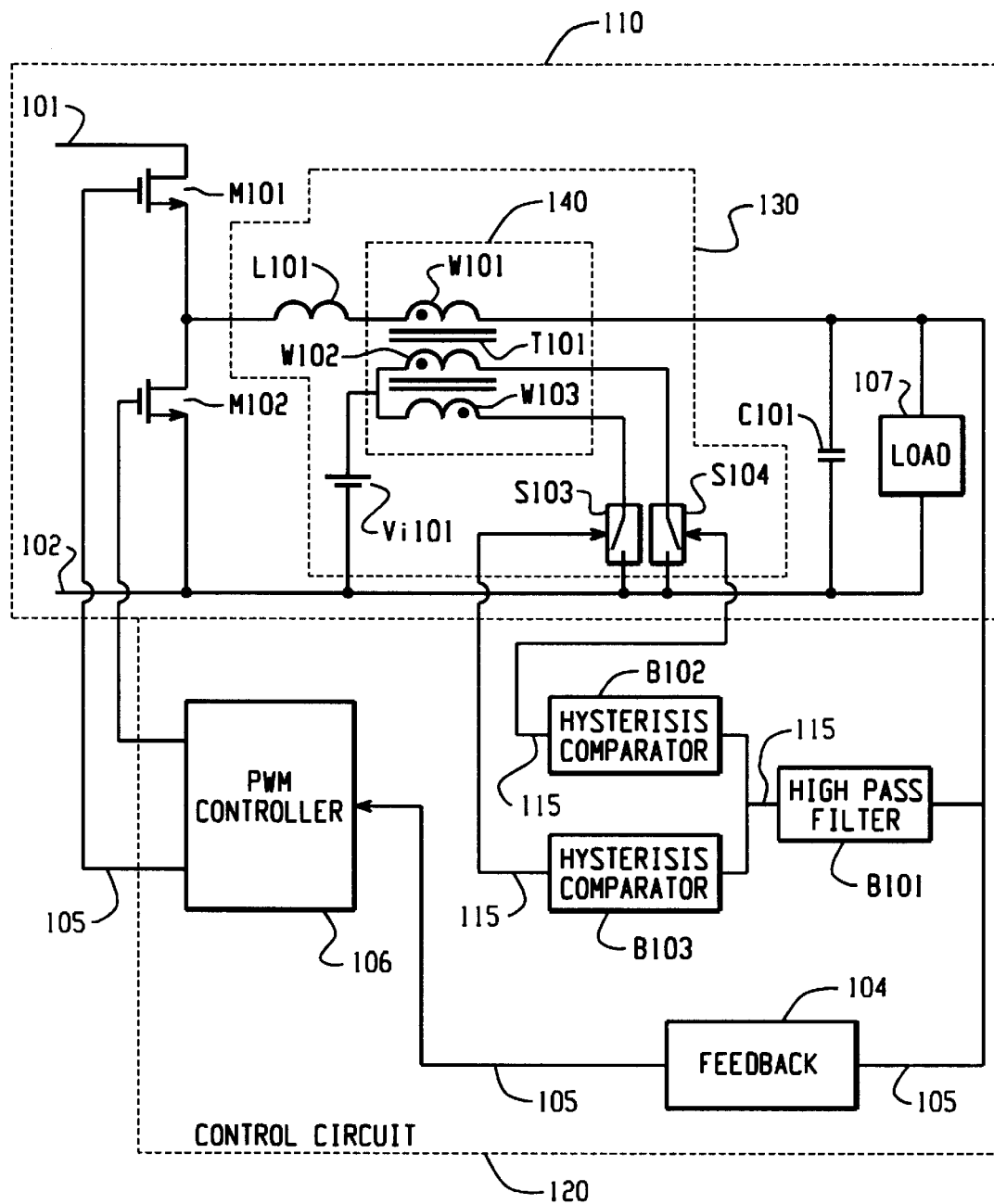
FIG. 3 is a schematic diagram of a first embodiment of the present invention implemented in a Buck converter topology.

FIG. 3 sets forth a schematic diagram of a first embodiment of the present invention incorporated into a power converter. This embodiment comprises a power circuit 110 and a control circuit 120. The power circuit 110 includes a pair of input terminals 101 and 102, which are connectable to a DC voltage source to receive input power, and an output capacitor C101 for providing regulated DC output power to a load 107 coupled to the output capacitor C101. The power circuit 110 further includes a pair of switches M101 & M102, which in this embodiment are represented by MOSFETs but alternatively could be any of a number of suitable devices such as BJTs, electromechanical, IGBTs, and semiconductor switches. The switches M101 & M102 are controllable by the control circuit 120 to produce a series of alternating voltage pulses.

Coupled between the switches M101 & M102 and the output capacitor C101 is a magnetic circuit 130. The magnetic circuit 130 comprises a comparatively lower inductance fixed inductor L101 and a comparatively higher inductance variable inductance device 140. The variable inductance device 140 operates at a steady inductance level during normal operation of power circuit 110 to provide sufficient inductance to allow power circuit 110 to operate with low ripple voltage. When there is a fast transient current in power circuit 110, variable inductance device 140 is operable to function at a reduced inductance level, preferably close to zero inductance, thereby improving the transient response of the power circuit 110.

The variable inductance device 140 shown in this first embodiment of the invention consists of a transformer T101 having three windings W101, W102 and W103. Winding W101 is coupled in series with fixed inductor L101 and is coupled between the input terminals 101 and 102 and the output capacitor C101. Windings W102 and W103 are magnetically coupled to winding W101 and are each coupled to a voltage source Vi101. In the embodiment shown, windings W102 and W103 are coupled to the same voltage source but, alternatively, could be coupled to different voltage sources. The windings W102 and W103 are also coupled to bi-directional switches S103 and S104. Bi-directional switches S103 and S104 are operable to control the connection of voltage source Vi101 to windings W103 and W102, respectively. Bi-directional switching S103 and S104 could be any number of suitable devices such as MOSFETs, BJTs, IGBTs, and semiconductor switches.

The control circuit 120 comprises two loops, a Pulse Width Modulation (PWM) loop 105 and a variable inductance control loop 115. The PWM loop 105 includes a feedback block 104 which is coupled to a PWM block 106. The feedback block 104 is operable to monitor the converter load voltage, and the PWM block 106 is operable to provide driving pulses to the switches M101 & M102 in the power circuit 110.

The variable inductance control loop 115 includes circuits that monitor the converter load voltage and produce driving signals for switches S103 and S104 in the power circuit 110. The variable inductance control loop circuits, in the first embodiment, comprise a high pass filter B101, which is operable to monitor the converter load voltage, and two hysteresis comparators B102 and B103, which are coupled to switches S104 and S103, respectively.

During steady state operation, the feedback block 104 generates signals to control the PWM controller 106 which, in turn, generates gate pulses to drive MOSFETs M101 and M102 to maintain a steady voltage across the load 107. The steady state operation is the same as that of a conventional converter, except that the output inductor consists of two series inductors L101 and W101 instead of one inductor. In the first embodiment, inductor L101 is a separate physical inductor from winding W101, however, alternatively inductor L101 could be leakage inductance and integrated with transformer T101 so that there would be no need for a separate physical inductor. Also during steady state operation, the switches S103 and S104 are opened. Consequently, the inductance of W101 is high to keep the ripple current low.

Figure 4:
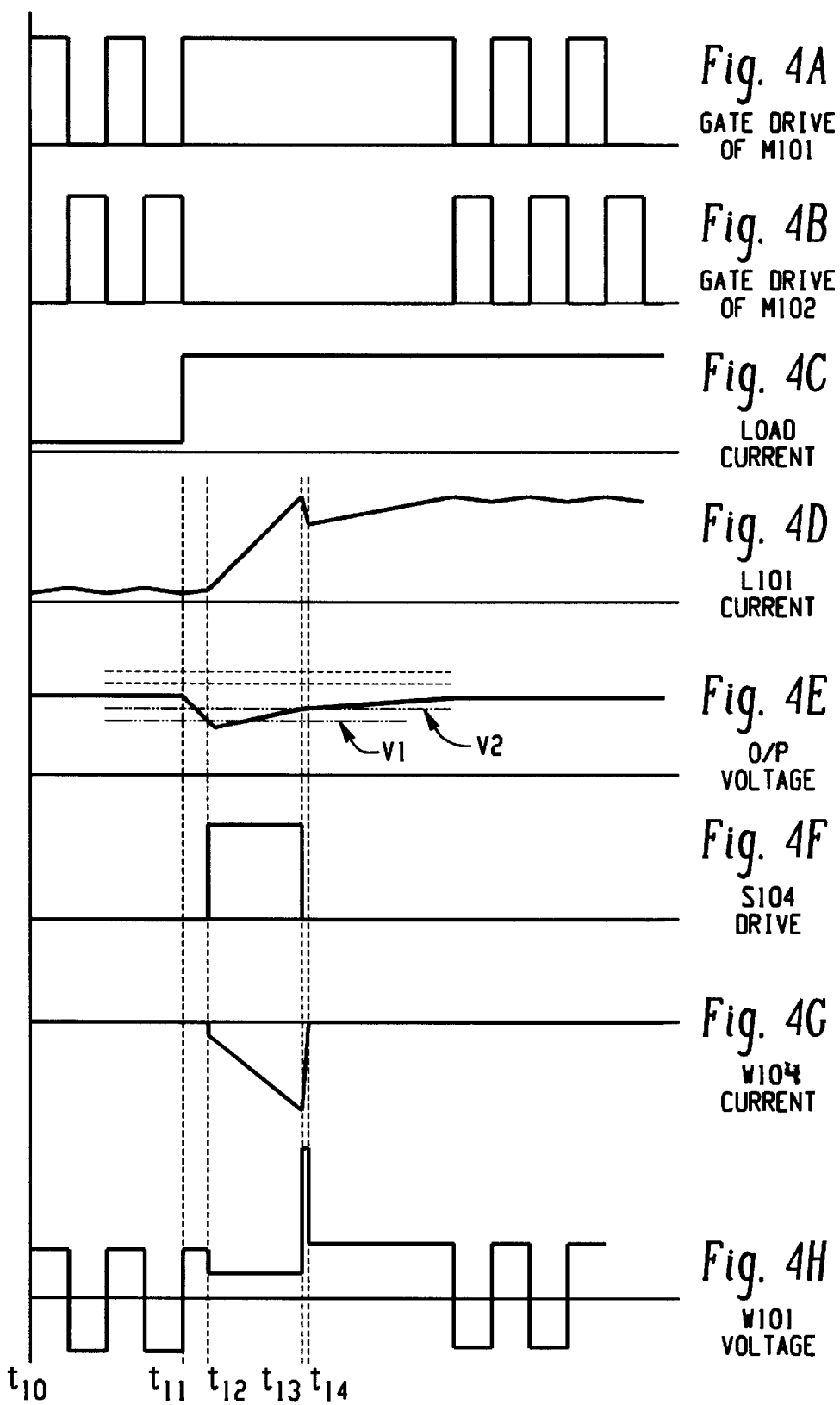
FIGS. 4A–4H is a waveform diagram showing the response of the first embodiment of the present invention when there is a fast transient increase in load current.

When there is a fast transient increase in load current, the converter of FIG. 3 responds to the transient condition as illustrated by the waveforms shown in FIG. 4. In the period between t10 and t11, the converter operates in steady state. At time t11 there is a step increase in load current as shown in FIG. 4C. This leads to an output voltage drop as shown in FIG. 4E.

When the output voltage drops below a threshold level V1, switch S104 is switched on by the operation of filter B101 and comparator B102 thereby shorting voltage source Vi101 to winding W102. As a result, the inductance of winding W101 decreases and the equivalent inductance of inductors L101 & W101 decreases to the inductance of inductor L101. The current through inductor L101, consequently is capable of rising rapidly as shown in FIG. 4D due to the decreased inductance. In the time period between t12 and t13 current flows through winding W102 as well. This current consists of the reflected current from winding W101 and magnetizing current resulting from voltage source Vi101 being applied to winding W102. The magnitude of the current flowing through winding W102 is dependent on the turns ratio of windings W101 and W102. As a result of the increase in the current through inductor L101 and the magnetizing current flowing through transformer T101, the output voltage increases. When the output voltage reaches a second voltage level V2 at time t13, switch S104 is turned off.

At time t13, switch S104 is off and the current through winding W102 falls to zero during the time period t13 to t14. When switch S104 is off, the magnetizing current of transformer T101 will be coupled to winding W101. At time t13, the current flowing through inductor L101 and the magnetizing current flowing through winding W101 may not necessarily be the same. The difference in current will charge up the stray capacitance of switch S104 and create a voltage spike in winding W101 during the time period between t13 and t14 as shown in FIG. 4H. An energy absorption circuit such as a snubber circuit could be employed to guard against overvoltage in winding W101. Such an energy absorption circuit could alternatively be coupled to inductor L101, transformner T101, switch S103 or switch S104.

After time t14 the equivalent series output inductance of power circuit becomes higher than it was during the transient period because, at time t14, the equivalent series output inductance includes the inductance of inductor L101 and winding W101. The output inductor current cannot change as rapidly as when inductor W101 is effectively at zero inductance. If the inductor current is sufficient to meet the load demands, the output voltage will rise and the PWM loop 105 will resume its normal pulse width modulation. It is possible, however, that the inductor current at time t14 may not be sufficient to meet the load current demands and, as a result, the output voltage may fall after switch S104 has switched to an off-state at t14. In this case, the output voltage may decrease below the threshold level V1 and switch S104 may be switched to an on state again. If this happens, the cycle is repeated until the inductor current through L101 is sufficient to meet the load current demands. Eventually, the output voltage will rise to a level so that normal pulse width modulation may resume.

Figure 5:
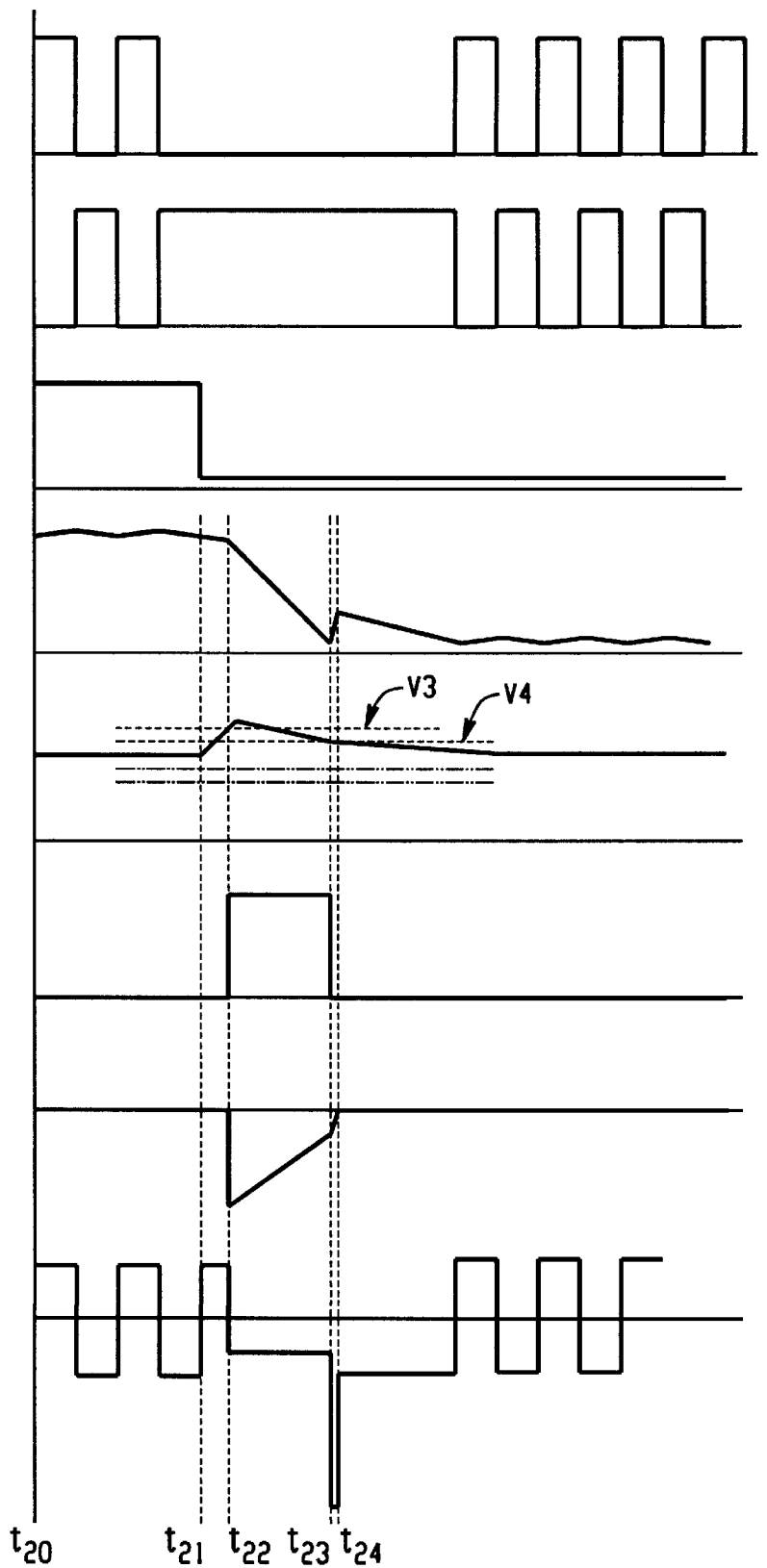
FIGS. 5A–5H is a waveform diagram showing the response of the first embodiment of the present invention when there is a fast transient decrease in load current.

When there is a fast transient decrease in load current, the converter responds to the transient condition as shown in FIG. 5. During the time period between t20 and t21, the converter operates with a steady load current. At time t21, there is a step decrease in the load current as shown in FIG. 5C. As a result, the output voltage rises as shown in FIG. 5E. Even if the PWM loop 105 is fast enough to turn off MOSFET M101 and turn on MOSFET M102, the current reduction in inductor L101 will still be too slow because of the high combined inductance of inductor L101 and winding W101. When the output voltage reaches a threshold level V3 at time t22, filter B101 and comparator B103 triggers switch S103 to switch to an on-state. As a result, winding W103 is coupled to the voltage source Vi101, the inductance of winding W101 effectively decreases to zero, and winding W103 allows for a rapid decrease in output inductor current through W101. A magnetizing current is also generated in winding W103.

The reduction in output inductor current causes the output voltage to decrease until it reaches a threshold voltage level V4 at time t23. At this time, switch S103 is switched to an off state and the magnetizing current is transferred to winding W101. The magnetizing current may not match the current flow in inductor L101 thereby causing a voltage spike across winding W101 in the time period t23 to t24 as shown in FIG. 5H. An energy absorption circuit such as a snubber circuit can be employed to avoid overvoltage in winding W101. An appropriate energy absorption circuit may be coupled, alternatively, to inductor L101, transformer T101, switch S103 or switch S104.

In the time period after time t24, the output voltage gradually reduces to an appropriate level so that the PWM loop 105 resumes normal operation. It is possible, however, that the current through inductor L101 may not have fallen sufficiently to prevent the output voltage from reaching voltage threshold level V3 after time t24. In this case, the process will repeat until the inductor current is sufficiently reduced.

During steady state operation, the equivalent series inductance of the series inductors is the summation of the inductance. The inductor W1 is designed to have a high enough inductance to minimize the ripple current thereby minimizing RMS current flowing through the switching elements and other components. The inductor L101 is designed to have a low enough inductance to provide a fast rate of current charge when the inductor W101 is shorted out during transient conditions. Transient conditions only exist for a short time and the converter spends most of its operating time in the steady state. Hence the converter will have a high ripple current only for a short duration and efficiency will not be seriously impaired. This invention is versatile and can be applied to most switching converters which use an output inductor.

As shown in the description of the first embodiment, the present invention provides a means to keep the output voltage of a converter within limits and is able to provide a fast transient response when faced with sudden load current changes.

SECOND EMBODIMENT

Figure 6:
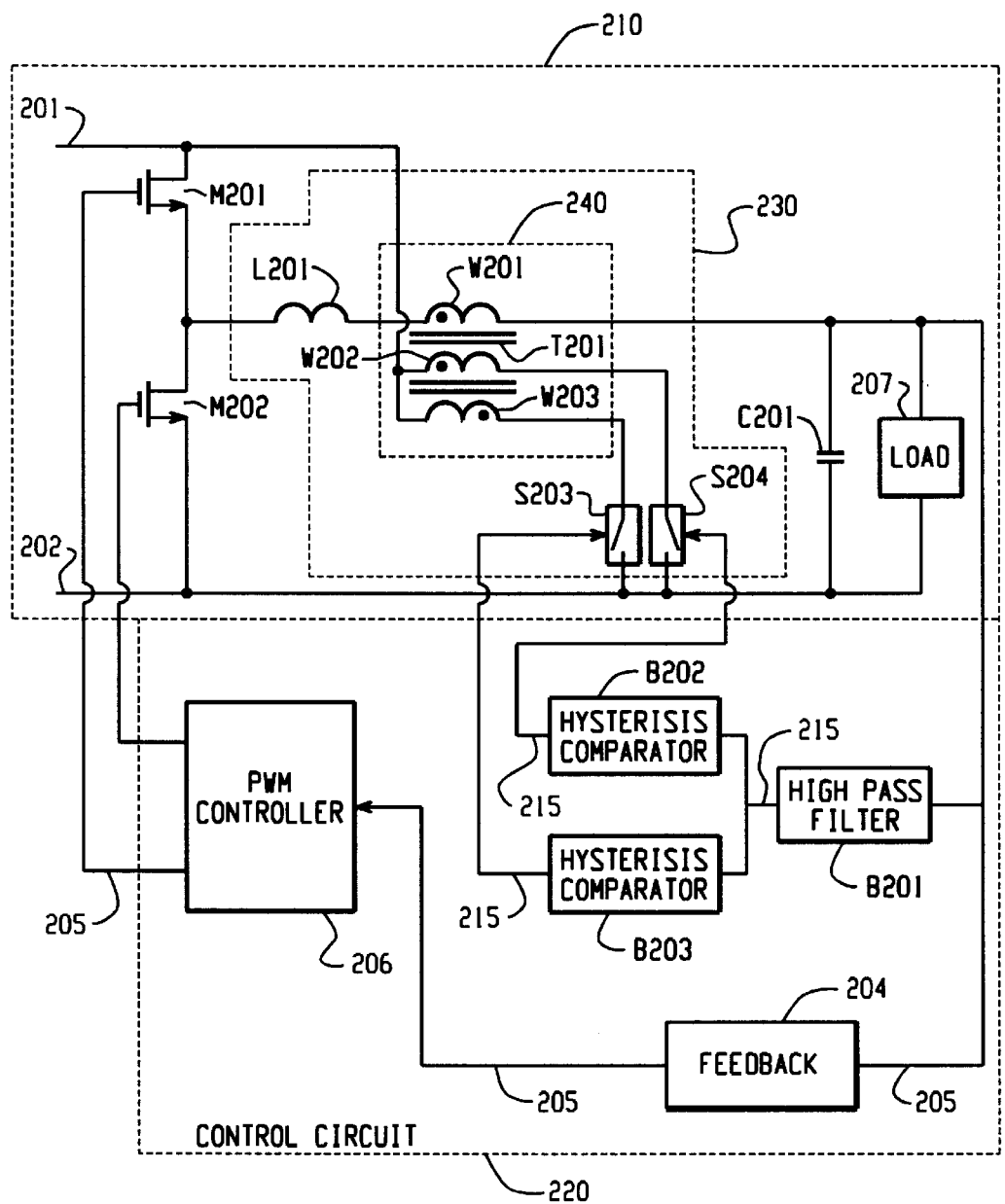
FIG. 6 is a schematic diagram of a second embodiment of the present invention implemented in a Buck converter topology.

FIG. 6 sets forth a schematic diagram of a second embodiment of the present invention incorporated into a power converter. This embodiment differs from the first embodiment in that the auxiliary voltage source of the first embodiment is eliminated by the use of the input voltage source as the auxiliary voltage source. This second embodiment comprises a power circuit 210 and a control circuit 220.

The power circuit 210 includes a pair of input terminals 201 and 202, which are connectable to a DC voltage source to receive input power, and an output capacitor C201 for providing regulated DC output power to a load 207 coupled to the output capacitor C201. The power circuit 210 further includes a pair of switches M201 & M202, which in this embodiment are represented by MOSFETs but, alternatively, could be any of a number of suitable devices such as BJTs, electromechanical switches, IGBTs, and semiconductor switches. The switches M101 & M102 are controllable by the control circuit 220 to produce a series of alternating voltage pulses. Coupled between the switches M201 &

M202 and the output capacitor C201 is a magnetic circuit 230. The magnetic circuit 230 comprises a comparatively lower inductance fixed inductor L201 and a comparatively higher inductance variable inductance device 240. The variable inductance device 240 operates at a steady inductance level during normal operation of power circuit 210 to provide sufficient inductance to allow power circuit 210 to operate with low ripple voltage. When there is a fast transient current in power circuit 210, variable inductance device 240 is operable to function at a reduced inductance level, preferably close to zero inductance, thereby improving the transient response of the power circuit 210.

The variable inductance device 240 shown in this second embodiment of the invention consists of a transformer T201 having three windings W201, W202 and W203. Winding W201 is coupled in series with fixed inductor L201 and is coupled between the input terminals 201 and 202 and the output capacitor C201. Windings W202 and W203 are magnetically coupled to winding W201 and are each coupled to the input voltage terminal 201. The windings W202 and W203 are also coupled to bi-directional switches S203 and S204. Bi-directional switches S203 and S204 are operable to control the connection of the input voltage source to windings W203 and W202, respectively.

The control circuit 220 comprises two loops, a Pulse Width Modulation (PWM) loop 205 and a variable inductance control loop) 215. The PWM loop 215 includes a feedback block 204 which is coupled to a PWM block 206. The feedback block 204 is operable to monitor the converter load voltage, and the PWM block 206 is operable to provide driving pulses to the switches M201 & M202 in the power circuit 210.

The variable inductance control loop 215 includes circuits that monitor the converter load voltage and produce driving signals for switches S203 and S204 in the power circuit. The variable inductance control loop circuits, in the second embodiment, comprise a high pass filter B201, which is operable to monitor the converter load voltage, and two hysteresis comparators B202 and B203, which are coupled to switches S204 and S203, respectively.

The operation of the power circuit 210 and the control circuit 220 of the second embodiment is the same as the power circuit 110 and the control circuit 120 of the first embodiment. Appropriate turns ratio of windings in transformer T201 are used.

THIRD EMBODIMENT

Figure 7:
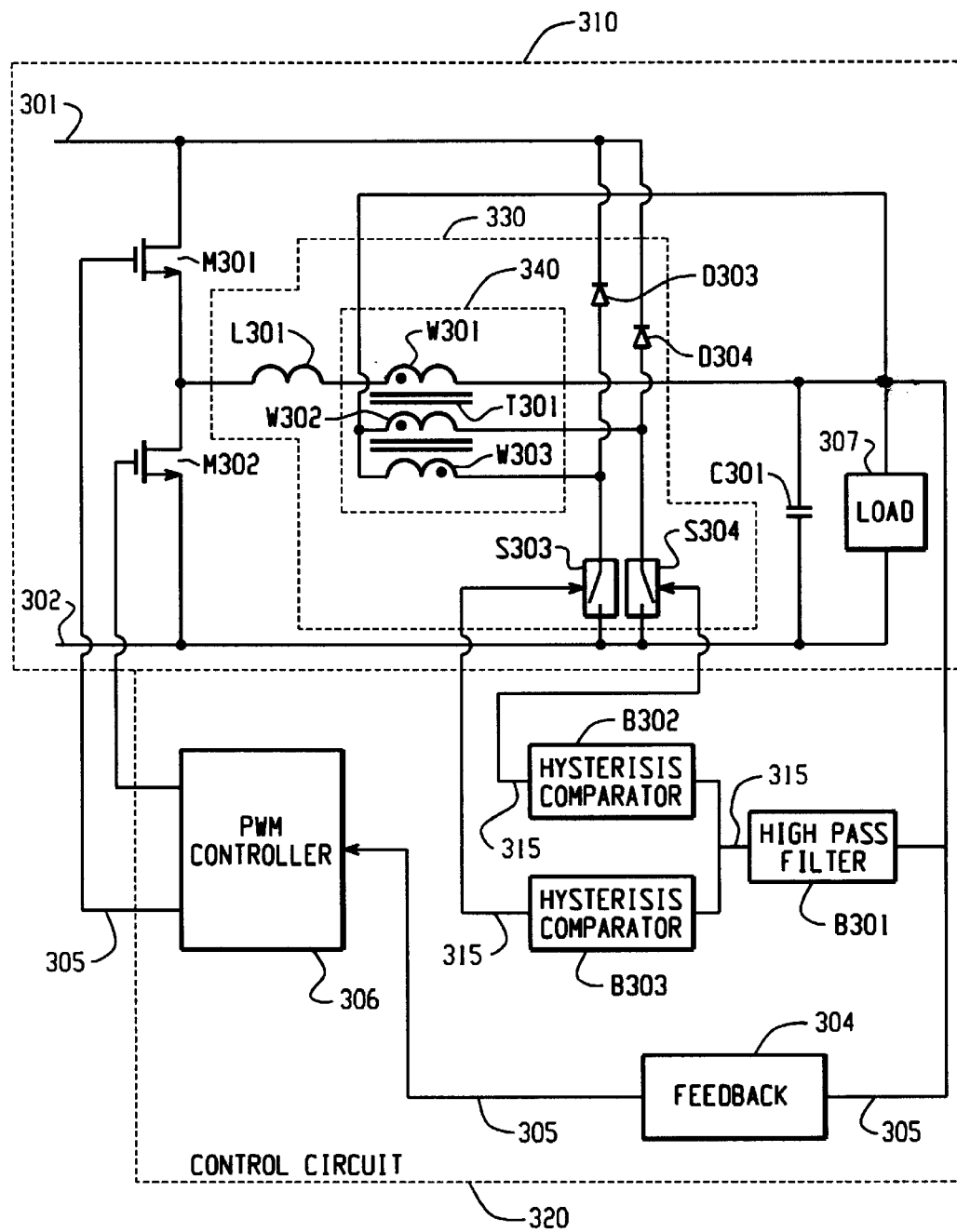
FIG. 7 is a schematic diagram of a third embodiment of the present invention implemented in a Buck converter topology.

FIG. 7 sets forth a schematic diagram of a third embodiment of the present invention incorporated into a power converter. This embodiment differs from the first embodiment, primarily, in that the auxiliary voltage source of the first embodiment is eliminated by the use of the output voltage source as the auxiliary voltage source. In addition, two clamping diodes are employed to protect the switches from overvoltage. This third embodiment comprises a power circuit 310 and a control circuit 320.

The power circuit 310 includes a pair of input terminals 301 and 302, which are coimectable to a DC voltage source to receive input power, and an output capacitor C301 for providing regulated DC output power to a toad 307 coupled to the output capacitor C301. The power circuit 310 further includes a pair of switches M301 & M302, which in this embodiment are represented by MOSFETs. The switches M301 & M302 are controllable by the control circuit 320 to produce a series of alternating voltage pulses.

Coupled between the switches M301 & M302 and the output capacitor C301 is a magnetic circuit 330. The magnetic circuit 330 comprises a comparatively lower inductance fixed inductor L301 and a comparatively higher inductance variable inductance device 340. The variable inductance device 340 operates at a steady inductance level during normal operation of power circuit 310 to provide sufficient inductance to allow power circuit 310 to operate with low ripple voltage. When there is a fast transient current in power circuit 310, variable inductance device 340 is operable to function at a reduced inductance level, preferably close to zero inductance, thereby improving, the transient response of the power circuit 310.

The variable inductance device 340 shown in this third embodiment of the invention consists of a transformer T301 having three windings W301, W302 and W303. Winding W301 is coupled in series with fixed inductor L301 and is coupled between the input terminals 301 and 302 and the output capacitor C301. Windings W302 and W303 are magnetically coupled to winding W301 and are each coupled to the output voltage terminal 303. The windings W302 and W303 are also coupled to bi-directional switches S303 and S304. Bi-directional switches S303 and S304 are operable to control the connection of the output voltage source to windings W303 and W302, respectively. Two diodes D303 and D304 are coupled to switches S303 and S304 respectively which clamp the switch voltagoes to the input voltage level.

The control circuit 320 comprises two loops, a Pulse Width Modulation (PWM) loop 305 and a variable inductance control loop 315. The PWM loop 305 includes a feedback block 304 which is coupled to a PWM block 306. The feedback block 304 is operable to monitor the converter load voltage, and the PWM block 306 is operable to putde driving pulses to the switches M301 & M302 in the power circuit 310.

The variable inductance control loop 315 includes circuits that monitor the converter load voltage and produce driving signals for switches S303 and S304 in the power circuit. The variable inductance control loop circuits, in the third embodiment, comprise a high pass filter B301, which is operible to monitor the converter load voltage, and two hysteresis comparators B302 and B303, which are coupled to switches S304 and S303, respectively.

The operation of the power circuit 310 and the control circuit 320 of the third embodiment is the same as the power circuit 110 and the control circuit 120 of the first embodiment. Appropriate turns ratio of windings in transformer T301 are used.

FOURTH EMBODIMENT

Figure 8:
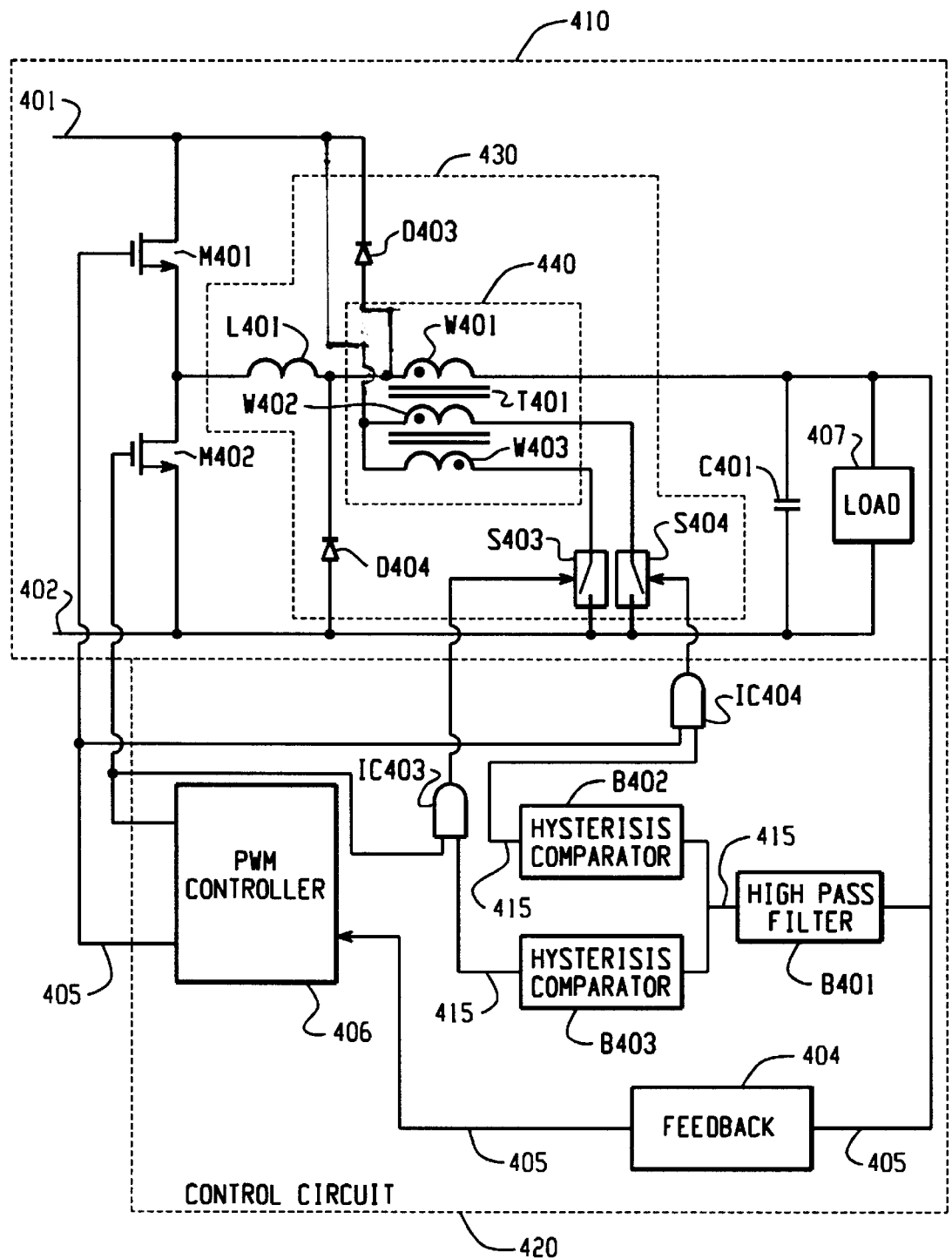
FIG. 8 is a schematic diagram of a fourth embodiment of the present invention implemented in a Buck converter topology.

FIG. 8 sets forth a schematic diagram of a fourth embodiment of the present invention incorporated into a power converter. This embodiment differs from the second embodiment, primarily, in that AND circuits IC403 and IC404 are added to ensure that the switching of switches S403 and S404 is coordinated with the switching of switches M401 and M402. Also clamping clamping diodes D403 and D404 are added to clamp voltage spikes that may be generated in the winding W401 as a result of a fast transient. This fourth embodiment also comprises a power circuit 410 and a control circuit 420.

The power circuit 410 includes a pair of input terminals 401 and 402, which are coimectable to a DC voltage source to receive input power, and an output capacitor C401 for providing regulated DC output power to a load 407 coupled to the output capacitor C401. The power circuit 410 further includes a pair of switches M401 & M402, which in this embodiment are represented by MOSFETs M401 and M402. The switches M401 & M402 are controllable by the control circuit 420 to produce a series of alternating voltage pulses.

Coupled between the switches M401 & M402 and the output capacitor C401 is a magnetic circuit 430. The magnetic circuit 430 comprises a comparatively lower inductance fixed inductor L401 and a comparatively higher inductance variable inductance device 440. The variable inductance device 440 operates at a steady inductance level during normal operation of power circuit 410 to provide sufficient inductance to allow power circuit 410 to operate with low ripple voltage. When there is a fast transient current in power circuit 410, variable inductance device 440 is operable to function at a reduced inductance level, preferably close to zero inductance, thereby improving the transient response of the power circuit 410.

The variable inductance device 440 shown in this fourth embodiment of the invention consists of a transformer T401 having three windings W401, W402 and W403. Winding W401 is coupled in series with fixed inductor L401 and is coupled between the input terminals 401 and 402 and the output capacitor C401. Two clamping diodes D403 and D404 are coupled to the node joining inductor L401 and winding W401. Windings W402 and W403 are magnetically coupled to winding W401 and are each coupled to the input voltage terminal 401. The windings W402 and W403 are also coupled to bi-directional switches S403 and S404. Bi-directional switches S403 and S404 are operable to control the connection of the output voltage source to windings W403 and W402, respectively.

The control circuit 420 comprises two loops, a Pulse Width Modulation (PWM) loop 405 and a variable inductance control loop 415. The PWM loop 405 includes a feedback block 404 which is coupled to a PWM block 406. The feedback block 404 is operable to monitor the converter load voltage, and the PWM block 406 is operable to provide driving pulses to the switches M401 & M402 in the power circuit 410.

The variable inductance control loop 415 includes circuits that monitor the converter load voltage and produce driving signals for switches S403 and S404 in the power circuit. The variable inductance control loop circuits, in the fourth embodiment, comprise a high pass filter B401, which is operable to monitor the converter load voltage, and two hysteresis comparators B402 and B403, which are coupled to AND gates IC403 and IC404 which, in turn, synchronize the switching of switches S403 and S404 with those of the main switches M402 and M401, respectively.

The operation of the power circuit 410 and the control circuit 420 of the fourth embodiment is the same as the power circuit 210 and the control circuit 220 of the second embodiment except for the functionality changed due to the addition of the clamping diodes and the additional AND gates.

Diodes D403 and D404 clamp the voltage at the node joining inductor L401 and winding W401 during the transient when either switch S403 or S404 transition off. When these switches transition off, often there is a mismatch of current through winding W401 before and after the turn off transient. This transient may generate voltage spikes which will be clamped by diodes D403 and D404 in order to recover the energy involved.

The addition of AND gate IC403 ensures that switch S403 is switched to an on state only when main switch M402 is switched to an on state even in the presence of a transient load current change. When there is a transient decrease in load current, winding W403 reduces the effective inductance of winding W401 only if switch M402 is switched to an on state to induce a decrease in current flow through inductor L401. This ensures the inductor current can decrease rapidly to meet the load demand.

The addition of AND gates IC404 ensures that switch S404 is switched to an on state only when main switch M401 is switched to an on state even in the presence of a transient load current change. When there is a transient increase in load current, winding W402 reduces the effective inductance of winding W401 only if switch M401 is switched to an on state to induce an increase of current flow through inductor L401. This ensures the inductor current can increase rapidly to meet the load demand.

FIFTH EMBODIMENT

Figure 9:
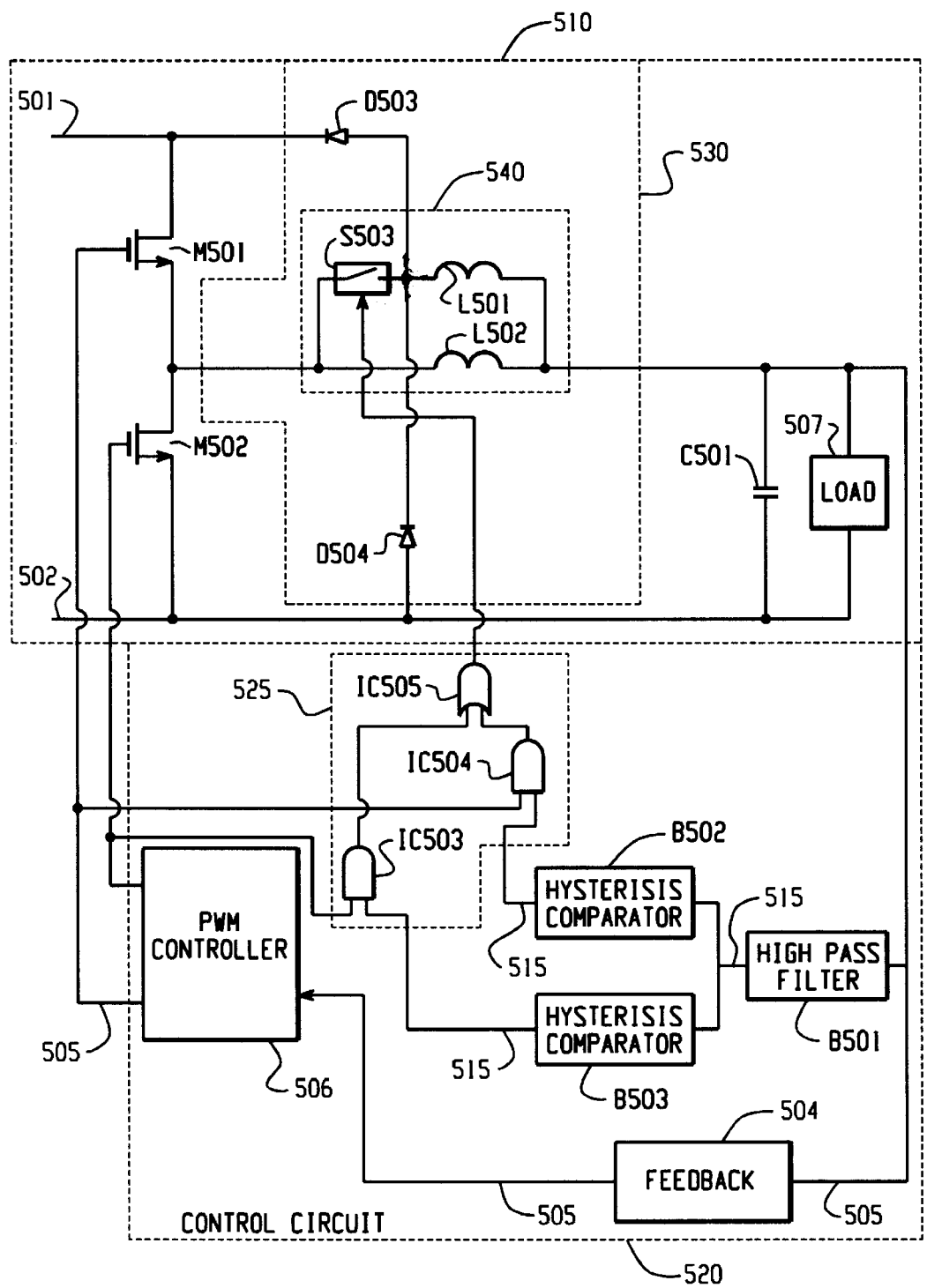
FIG. 9 is a schematic diagram of a fifth embodiment of the present invention implemented in a Buck converter topology.

FIG. 9 sets forth a fifth embodiment of the present invention incorporated into a power converter. In this embodiment, a different type of variable inductance device is employed. In this embodiment, the variable inductance device comprises a comparatively smaller inductor L501 coupled in series with a switch S503, the combination being coupled in parallel with a comparatively larger inductor L502. The switch S503 during normal operation of the converter is opened to isolate the small inductor L501 from the converter. When there is a transient change in the load voltage, the switch S503 is closed thereby coupling the small inductor L501 in parallel with the large inductor L502 and enabling fast current change. This fifth embodiment also comprises a power circuit 510 and a control circuit 520.

The power circuit 510 includes a pair of input terminals 501 and 502, which are connectable to a DC voltage source to receive input power, and an output capacitor C501 for providing regulated DC output power to a load 507 coupled to the output capacitor C501. The power circuit 510 further includes a pair of switches M501 & M502, which in this embodiment are represented by MOSFETs M501 and M502. The switches M501 & M502 are controllable by the control circuit 520 to produce a series of alternating voltage pulses.

Coupled between the switches M501 & M502 and the output capacitor C501 is the variable inductance device 540 of this embodiment. The variable inductance device 540 operates at a high steady inductance level during normal operation of power circuit 510 to provide sufficient inductance to allow power circuit 510 to operate with low ripple voltage. When there is a fast transient current in power circuit 510, variable inductance device 540 is operable to function at a reduced inductance level thereby improving the transient response of the power circuit 510.

The variable inductance device 540 shown in this fifth embodiment of the invention consists of an inductor L501 with a series switch S503 coupled in parallel with inductor L502. Two voltage clamping diodes D503 and D504 are coupled to the node between switch S503 and inductor L501 to protect switch S503.

The control circuit 520 comprises two loops, a Pulse Width Modulation (PWM) loop 505 and a variable inductance control loop 515. The PWM loop 505 includes a feedback block 504 which is coupled to a PWM block 506. The feedback block 504 is operable to monitor the converter load voltage, and the PWM block 506 is operable to provide driving pulses to the switches M501 & M502 in the power circuit 510.

The variable inductance control loop 515 includes circuits that monitor the converter load voltage and produce driving signals for switch S503. The variable inductance control loop circuits, in the fifth embodiment, comprise a high pass filter B501, which is operable to monitor the converter load voltage, and two hysteresis comparators B502 and B503. The output of the two hysteresis comparators B502 and B503 input to a logic circuit 525 comprising AND gates IC503 and IC504 and OR gate IC505. Logic circuit 525 is operable to synchronize the switching of switch S503 with the switching of the main switches M402 and M401.

During steady state operation, the feedback block 504 generates signals to control the PWM controller 506 which, in turn, generates gate pulses to drive MOSFETs M501 and M502 to maintain a steady voltage across the load 507. The steady state operation is the same as that for a conventional converter having an output inductor L502 and an output capacitor C501. Also during steady state operation, the switch S503 is in an open state so that inductor L501 does not affect the power conversion operation of the converter. Inductor L502 has a high enough inductance to suppress excessive ripple current. This provides for high efficiency during steady load operation. Inductor L501 has a considerably lower inductance than that of inductor L502.

When there is a fast transient increase in load current, the present converter responds to the transient condition as illustrated by the waveforms shown in FIG. 10. In the period between t30 and t31, the converter operates in steady state. At time t31 there is a step increase in load current as shown in FIG. 10C. This leads to an output voltage drop as shown in FIG. 10E. When the output voltage drops below a threshold level V11, switch S503 is switched on by the operation of filter B501, comparator B502, AND gate IC504, and OR gate IC505. As a result, inductor L501, which has a lower inductance, is connected in parallel with inductor L502. This reduces the overall converter inductance and, consequently, inductor current can rise rapidly as shown in FIG. 10D.

In the time period between t32 and t33, current flows through inductor L501 as well. This current causes the output voltage to increase. When the output voltage reaches a second voltage level V12 at time t33, as shown in FIG. 10, switch S503 is switched to an off state by the operation of filter B501, comparator B502, AND gate IC504, and OR gate IC505. Current flowing through inductor L501 is diverted through diode D504 and decreases until time t34. At time t34, diode D504 turns off and the current through inductor L501 diminishes to zero.

During the time period t32 to t34, the current in inductor L502 rises. If the current rose enough to support the load demands from time t34 and beyond, the converter will resume normal pulse width modulation with switches M501 and M502. If the current has not risen sufficiently to meet load demands, the output voltage will drop back to voltage level V11 and the sequence will be re-initiated to boost the output voltage. Eventually, the output voltage will rise to a level so that normal pulse width modulation may resume.

When there is a fast transient decrease in load current, the converter of FIG. 9 responds to the transient condition as shown in FIG. 11. During the time period between t40 and t41, the converter operates with a steady load current. At time t41, there is a step decrease in the load current as shown in FIG. 11C. As a result, the output voltage rises as shown in FIG. 11E. Even if the PWM loop 520 is fast enough to turn off MOSFET M501 and turn on MOSFET M502, the current reduction in inductor L502 is still too slow because of the high inductance of inductor L502. When the output voltage reaches a threshold level V13 at time t42, switch S503 is switched to an on state by the operation of filter B501, comparator B503, AND gate IC503, and OR gate IC505. As a result, inductor L501 which has much smaller inductance is connected in parallel with inductor L502. This reduces the overall converter inductance and current can change rapidly as shown in FIG. 11D.

During the time between t42 and t43, current increases in the negative sense through inductor L501. This current causes the output voltage to decrease until the output voltage reaches voltage level V14 as shown in FIG. 11E. When voltage level V14 is reached, switch S503 is switched to an off state by the operation of filter B501, comparator B503, AND gate IC503, and OR gate IC505. Current flowing through inductor L501 is diverted through diode D503 and reduced until time t44. At time t44 diode D503 is turned off and current flowing through inductor L501 diminishes to zero.

During time period t42 to t44, current flowing through inductor also decreases. If the inductor current has decreased enough to sufficiently reduce the output voltage at time t34 and beyond, the converter will resume normal pulse with modulation. If the inductor current has not decreased sufficiently, the output voltage will increase again to voltage level V13 and the whole process will be re-initiated to step down the output voltage.

The present invention has been described with reference to a buck converter topology. It would be obvious, however, to those skilled in the art to apply the invention to other converter topologies such as a boost converter, a flyback converter, a forward converter, a push-pull converter, a resonant converter, a full bridge converter, a Cuk converter, a Sepic converter, a half bridge converter and other converter topologies, without departing from the spirit of the invention. A number of embodiments that have particular utility for fast transient applications in switching power converters have been described. The embodiments described herein are just a few of the embodiments that may be generated by those skilled in the art using the invention described herein. Having described in detail the preferred and alternate embodiments of the present invention, including preferred modes of operation, it is to be understood that the present invention could be carried out with different elements and steps. The preferred and alternate embodiments are presented only by way of example and are not meant to limit the scope of the present invention which is defined by the following claims.

What is claimed is:

1. A power converter comprising:
    an input for receiving input power;
    an output for providing regulated output power;
    a variable inductance device coupled between the input and the output, said variable inductance device having a higher inductance state and a lower inductance state, said variable inductance device being controllable to switch between said higher inductance state and said lower inductance state; and
    a control circuit that is operable to sense voltage at the output and is operable to signal said variable inductance device to switch from one of said inductance states to said other inductance state in response to a deviation in the output voltage.

2. The power converter of claim 1 wherein said variable inductance device comprises a fixed inductance component and a variable inductance component, said variable inductance component coupled in series with said fixed inductance component, said variable inductance component comprising a transformer having a plurality of windings.

3. The power converter of claim 2 wherein said transformer has three windings.

4. The power converter of claim 2 wherein a first winding of said transformer is in series with said fixed inductance component.

5. The power converter of claim 4 further comprising an auxiliary power source that is coupled in series with a second winding of said transformer and a first switch.

6. The power converter of claim 5 wherein said auxiliary power source is coupled in series with a third winding of said transformer and a second switch.

7. The power converter of claim 5 wherein said auxiliary power source is coupled to said input power source.

8. The power converter of claim 5 wherein said auxiliary power source is coupled to said output.

9. A power converter comprising:
   an input for receiving input power;
   an output for providing regulated output power;
   a variable inductance device coupled between the input and the output, said variable inductance device having a higher inductance state and a lower inductance state, said variable inductance device being controllable to switch between said higher inductance state and said lower inductance state; said variable inductance device further comprising:
      a lower inductance element;
      a switch coupled in series with said lower inductance element thereby forming a switch and lower inductance element series combination; and
      a higher inductance element coupled in parallel with said switch and lower inductance element series combination; and
      wherein said switch is operable to switch said variable inductance device between said lower inductance state and said higher inductance state and
   a control circuit that is operable to sense voltage at the output and is operable to signal said variable inductance device to switch from one of said inductance states to said other inductance state in response to the sensed output voltage.

10. The power converter of claim 9 wherein said control circuit comprises a first comparator, said first comparator being operable to sense voltage at said output and to signal said variable inductance device to switch from said high inductance state to said low inductance state in response to the sensed output voltage.

11. The power converter of claim 10 wherein said control circuit further comprises a second comparator, said second comparator being operable to sense voltage at said output and to signal said variable inductance device to switch from said low inductance state to said high inductance state in response to the sensed output voltage.

12. The power converter of claim 11 further comprising:
   a pulse width modulation controller coupled to said switch, said pulse width modulation controller being operable to signal said switch to switch said variable inductance device between said lower inductance state and said higher inductance state.

13. A device comprising:
   an input for receiving input power;
   an output for providing regulated output power;
   an electrical load coupled to said output to receive regulated output power;
   a variable inductance device coupled between the input and the output, said variable inductance device having a higher inductance state and a lower inductance state, said variable inductance device being controllable to switch between said higher inductance state and said lower inductance state; and
   a control circuit that is operable to sense voltage at the output and is operable to signal said variable inductance device to switch from one of said inductance states to said other inductance state in response to a deviation in the output voltage.

14. The device of claim 13 wherein said variable inductance device comprises a fixed inductance component and a variable inductance component, said variable inductance component coupled in series with said fixed inductance component; said variable inductance component further comprising a transformer having a plurality of windings.

15. The device of claim 14 wherein said transformer has three windings.

16. The device of claim 14 wherein a first winding of said transformer is in series with said fixed inductance component.

17. The device of claim 16 further comprising an auxiliary power source that is coupled in series with a second winding of said transformer and a first switch.

18. The device of claim 17 wherein said auxiliary power source is coupled in series with a third winding of said transformer and a second switch.

19. The device of claim 17 wherein said auxiliary power source is coupled to said input power source.

20. The device of claim 17 wherein said auxiliary power source is coupled to said output.

21. The device of claim 13 wherein said variable inductance device comprises:
   a lower inductance element;
   a switch coupled in series with said lower inductance element thereby forming a switch and lower inductance element series combination; and
   a higher inductance element coupled in parallel with said switch and lower inductance clement series combination; and
   wherein said switch is operable to switch said variable inductance device between said lower inductance state and said higher inductance state.

22. The device of claim 21 wherein said control circuit comprises a first comparator, said first comparator being operable to sense voltage at said output and to signal said variable inductance device to switch from said high inductance state to said low inductance state in response to the sensed output voltage.

23. The device of claim 22 wherein said control circuit further comprises a second comparator, said second comparator being operable to sense voltage at said output and to signal said variable inductance device to switch from said low inductance state to said high inductance state in response to the sensed output voltage.

24. The device of claim 23 further comprising:
   a pulse width modulation controller coupled to said switch, said pulse width modulation controller being operable to signal said switch to switch said variable inductance device between said lower inductance state and said higher inductance state.

25. A switching power converter apparatus comprising:
   a first node of the apparatus that provides switching voltage pulses;
   a first inductor;
   a first transformer having a plurality of windings magnetically coupled with one another, said transformer including a first winding coupled to said first inductor, a second winding, and a third winding;

a voltage source;

a first switch coupled to said second winding and operable to couple voltage from said voltage source to said second winding;

a second switch coupled to said third winding and operable to couple voltage from said voltage source to said third winding;

a first control circuit that is operable to cause said first switch to couple said voltage from said voltage source to said second winding;

a second control circuit that is operable to cause said second switch to couple said voltage from said voltage source to said third winding;

a unit, comprising said first inductor and first transformer, coupled to said first node that provides switching voltage pulses;

an output capacitor coupled to said unit and to a return node of said converter;

output terminals coupled to said output capacitor for connection to a load; and an overvoltage protection circuit that is operable to guard said first and said second switches against exposure to overvoltages.

26. The apparatus according to claim 25 further comprising means for monitoring converter load voltage at said output terminals; and wherein said first control means is operable to cause said first switch to couple said voltage from said voltage source to said second winding when said load voltage falls below a first voltage level, said first control means being operable to cause said first switch to decouple said voltage source from said second winding when said load voltage rises above a second voltage level that is higher than said first voltage level; and said second control means is operable to cause said second switch to couple said voltage source to said third winding when said load voltage rises above a third voltage level, said second control means being further operable to cause said second switch to decouple said voltage source from said third winding when said load voltage falls below a fourth voltage level that is lower than said third voltage level; and whereby said third and fourth voltage levels are higher than said first and second voltage levels.

27. A switching power converter apparatus comprising:

a pair of input terminals for connection to a DC voltage source, the first of said terminals being a positive terminal and the second of said terminals being a negative terminal;

a first node of the apparatus that provides switching voltage pulses;

a first inductor;

a first transformer having a plurality of windings magnetically coupled with one another, said windings including a first winding coupled to said first inductor, a second winding, and a third winding;

a first switch coupled to said second winding;

a second switch coupled to said third winding;

a unit, comprising the said first inductor and first transistor, coupled to said first node that provides switching voltage pulses;

an output capacitor coupled to said unit and to a return node of said converter;

a pair of output terminals, the first of said output terminals being a positive terminal and the second of said output terminals being a negative terminal, coupled to said output capacitor for providing a connection point for a load;

a first control circuit that is operable to cause said first switch to couple said second winding to said output capacitor;

a second control circuit that is operable to cause said second switch to couple said third winding to said output capacitor; and an overvoltage protection circuit that is operable to guard said first and said second switches against exposure to overvoltages.

28. The apparatus according to claim 27 wherein said overvoltage protection circuit comprises:

a first diode with its cathode coupled to said positive input terminal and its anode coupled to a node joining said second winding and said first switch; and a second diode with its cathode coupled to said positive input terminal and its anode coupled to a node joining said third winding and said second switch.

29. The apparatus according to claim 27 wherein said overvoltage protection circuit comprises:

a first diode with its anode coupled to a node joining said first inductor and said first transformer winding and its cathode coupled to said positive input terminal; and a second diode with its anode coupled to said negative input terminal and its cathode coupled to said anode of said first diode.

30. The apparatus according to claim 27 further comprising means for monitoring the converter load voltage at said output terminals; and wherein said first control circuit is operative to cause said first switch to couple said second winding to said output capacitor when said load voltage falls below a first voltage level, said first control circuit also being operative to cause said first switch to decouple said second winding from said output capacitor when said load voltage rises above a second voltage level that is higher than said first voltage level; and said second control circuit is operative to cause said second switch to couple said third winding to said output capacitor when said load voltage rises above a third voltage level, said second control circuit being further operative to cause said second switch to decouple said third winding from said output capacitor when said load voltage falls below a fourth voltage level that is lower than said third voltage level; and whereby said third and fourth voltage levels are higher than said first and second voltage levels.

31. The apparatus according to claim 30 further comprising:

means for switching said first switch to an on-state only if a high pulse voltage is coupled to said first inductor; and means for switching said second switch to and on-state only if a low pulse voltage is coupled to said first inductor.

32. A switching power converter apparatus comprising:

a pair of input terminals for connection to a DC voltage source, the first of said terminals being a positive terminal and the second of said terminals being a negative terminal;

a first node of the apparatus that provides switching voltage pulses having a high voltage level and a low voltage level;

a first inductor coupled to said first node;

a second inductor coupled to a first series switch thereby forming an inductor series-switch combination, said combination being coupled in parallel with said first inductor;

a first diode with its cathode coupled to said positive input terminal and its anode coupled to a node joining said second inductor and said first series switch;

a second diode with its anode coupled to said negative input terminal and its cathode coupled to a node joining said second inductor and said first series switch;

a control circuit that is operable to cause said first series switch to couple said second inductor in parallel with said first inductor;

an output capacitor coupled to said first inductor and a return node of the converter;

a pair of output terminals coupled to said output capacitor for providing a connection point for a load; and an overvoltage protection circuit that is operable to guard said first switch against exposure to an overvoltage.

33. The apparatus according to claim 32 further comprising means for monitoring the converter load voltage at said output terminals; and wherein said control circuit is operative to cause said first series switch to couple said second inductor in parallel with said first inductor when said load voltage falls below a first voltage level, said control circuit also being operative to cause said first series switch to decouple said second inductor from said first inductor when said load voltage rises above a second voltage level that is higher than said first voltage level, said control circuit being further operative to cause said first series switch to couple said second inductor in parallel with said first inductor when said load voltage rises above a third voltage level, said control means also being operative to cause said first series switch to decouple said second inductor from said first inductor when said load voltage falls below a fourth voltage level that is lower than said third voltage level; and whereby said third and fourth voltage levels are higher than said first and second voltage levels.

34. The apparatus according to claim 33 further comprising:

means for switching said first series switch to an on-state only if a high pulse voltage is coupled to said first inductor; and means for switching said first series switch to an off-state only if a low pulse voltage is coupled to said first inductor.

35. The power converter of claim 1 wherein said control circuit comprises a first comparator, said first comparator being operable to sense voltage at said output and to signal said variable inductance device to switch from said high inductance state to said low inductance state in response to the sensed output voltage.

36. The power converter of claim 35 wherein said control circuit further comprises a second comparator, said second comparator being operable to sense voltage at said output and to signal said variable inductance device to switch from said low inductance state to said high inductance state in response to the sensed output voltage.

37. The power converter of claim 36 further comprising:

switch means coupled to said variable inductance device, said switch means having a first state and a second state, said switch means being operable to allow input power to reach said variable inductance device when in said first state, said switch means being operable to resist the flow of input power to said variable inductance device when in said second state; and a pulse width modulation controller coupled to said switch means, said pulse width modulation controller being operable to signal said switch means to transition to said first state or said second state.

38. The power converter of claim 37 further comprising means operable to signal said variable inductance device to switch from said high inductance state to said low inductance state when said switch means is in said first state, said means also being operable to signal said variable inductance device to switch from said low inductance state to said high inductance state when said switch means is in said second state.

39. The device of claim 13 wherein said control circuit comprises a first comparator, said first comparator being operable to signal said variable inductance device to switch from said high inductance state to said low inductance state.

40. The device of claim 39 wherein said control circuit further comprises a second comparator, said second comparator being operable to signal said variable inductance device to switch from said low inductance state to said high inductance state.

41. The device of claim 40 further comprising:

switch means coupled to said variable inductance device, said switch means having a first state and a second state, said switch means being operable to allow input power to reach said variable inductance device when in said first state, said switch means being operable to resist the flow of input power to said variable inductance device when in said second state; and a pulse width modulation controller coupled to said switch means, said pulse width modulation controller being operable to signal said switch means to transition to said first state or said second state.

42. The device of claim 41 further comprising means operable to signal said variable inductance device to switch from said high inductance state to said low inductance state when said switch means is in said first state, said means also being operable to signal said variable inductance device to switch from said low inductance state to said high inductance state when said switch means is in said second state.

* * * * *